No. 738,535. Patented September 8, 1903.

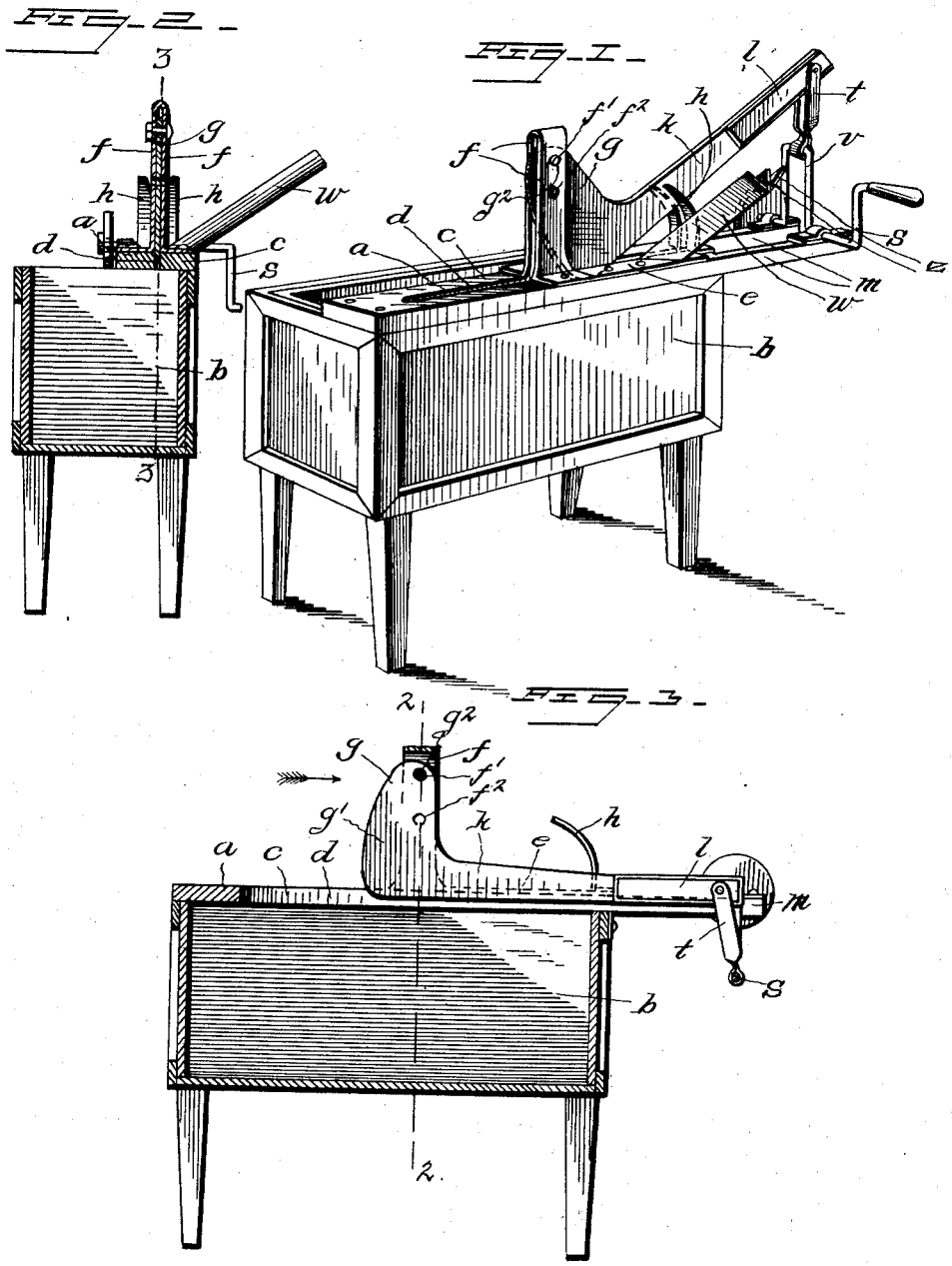

UNITED STATES PATENT OFFICE.

JULIEN V. FREDERICK, OF MARSHALLVILLE, GEORGIA.

FEED-CUTTER.

SPECIFICATION forming part of Letters Patent No. 738,535, dated September 8, 1903.

Application filed April 22, 1902. Serial No. 104,177. (No model.)

*To all whom it may concern:*

Be it known that I, JULIEN V. FREDERICK, a citizen of the United States, and a resident of Marshallville, in the county of Macon and State of Georgia, have made a certain new and useful Invention in Feed-Cutters; and I hereby declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a perspective view showing my invention as applied. Fig. 2 is a section on the line 2 2, Fig. 3. Fig. 3 is a section on the line 3 3, Fig. 2.

The invention has relation to feed-cutters; and it consists in the novel construction and combinations of parts, as hereinafter set forth.

In the accompanying drawings, illustrating the invention, the letter $a$ designates the framework and $b$ the box or receptacle for the cut feed, above which the frame is provided with longitudinal bars or a slotted bar, (indicated at $c$,) such bars or bar extending longitudinally along the front of the frame. The slot or knifeway $d$ is provided with metallic wear-plates $e$ in cases where the bar is made of wood.

Attached to the bar or bars $c$ at or near the inner end of the slot $d$ is the double-branched upright guide and fulcrum-standard $f$, connected at the top by a reverse bend of plate form and having a narrow interval between them, in which is pivoted the upwardly-extending or raised portion $g$ of the adjustable reciprocating knife $k$, such upwardly-extending portion or arm being about six inches in height and having holes for the pivot-pin about four and six inches, respectively, above the knife-edge or sufficiently elevated to cause the knife to assume when raised an angle of about thirty degrees or more or such as will provide for a strong descending drawing cut on the corn, hay, or other feed, such pivoted portion $g$ being integral with and of the same thickness as the knife and being of sufficient extent to guide the knife in an exact vertical plane, fitting, as it does, closely between the plate-form standard. This guideway also prevents the knife from cutting the edge of the knifeway $d$. The edge of the blade is straight and at the limit of its downward movement lies below the surface of the bars $c$ an inch or more, in which position the handle or extension end $l$ of the knife is horizontal, or nearly so, such extension lying between the extended ends or projections $m$ of the bars $c$ of the frame. To the projections $m$ are secured boxing or bearings for a crank-shaft $s$, and to the crank $v$ is connected a link $t$ of about the length of the crank, said link being pivoted at its upper end to the knife handle or extension.

To the feed side of the top of the frame or to the bar $c$ on the feed side is connected an inclined guide trough-frame $w$, which is subdivided into several channels or troughs $z$ $z$, which extend to the feed side of the cutting-slot or knifeway $d$. These channels or troughs serve to keep the hay or other feed properly directed and also serve especially to hold ears of corn in proper position for the action of the cutting-knife.

The crank-shaft $s$ is provided with a balance wheel or wheels to facilitate even working of the knife. A pedal connection may be provided for the knife, if desired. The upward extension $g$ of the knife extends at right angles to the length of said knife and is extended or made wider rearwardly at $g'$ for the purpose of more perfect guiding action between the standard $f$, as by this means a larger portion of such extension lies at all times between said standard. This extension has a normal projection forward of the standard, which projection is adapted to enter between the branches of the standard as the knife is raised. By changing the pivot-pin $g^2$ of the knife (which pin is removable) from the upper holes $f'$ of the standard to the lower holes $f^2$ the upward broad pivotal angular extension $g'$ of the knife-blade, having vertically-separated holes to correspond with holes $f'$ $f^2$ of the standard, a greater leverage is given to the cut of the knife. At the same time when the pin is in the upper holes and the knife is lowered a locking-pin may be placed through the lower holes $f^2$ of the standard and the lower hole of the part $g$ to prevent accidental or mischievous operation of the knife.

Having described this invention, what I claim, and desire to secure by Letters Patent, is—

A feed-cutter comprising the frame having the knifeway, the double-branched plate-fulcrum standard, having the reverse bend at the top, the rear guide and guard, the adjustable angular straight-edge knife-blade having at its forward end the upright broad pivotal right-angle extension working between and having a normal projection forward of the branches of said standard, said projection being adapted to enter between the branches of said standard as the knife is raised, said standard and right-angle extension having vertically-separated perforations, and an adjustable fulcrum-pin for adjustment therein, substantially as specified.

In testimony whereof I affix my signature in presence of two witnesses.

JULIEN V. FREDERICK.

Witnesses:
F. B. MURPH,
W. H. RICE.